(12) United States Patent
Ganai (10) Patent No.: US 7,949,511 B2
(45) Date of Patent: May 24, 2011

(54) SYSTEM AND METHOD FOR TUNNELING AND SLICING BASED BMC DECOMPOSITION

(75) Inventor: Malay K. Ganai, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 369 days.

(21) Appl. No.: 12/183,387

(22) Filed: Jul. 31, 2008

(65) Prior Publication Data

US 2009/0125294 A1    May 14, 2009

Related U.S. Application Data

(60) Provisional application No. 60/987,203, filed on Nov. 12, 2007.

(51) Int. Cl.
*G06F 9/445* (2006.01)
(52) U.S. Cl. ............... 703/22; 703/23; 716/5; 717/126
(58) Field of Classification Search ............... 703/22, 703/23; 717/126; 716/5
See application file for complete search history.

(56) References Cited

U.S. PATENT DOCUMENTS

| | | | |
|---|---|---|---|
| 7,516,109 B2 * | 4/2009 | Furtek | 706/19 |
| 2008/0120129 A1 * | 5/2008 | Seubert et al. | 705/1 |

\* cited by examiner

*Primary Examiner* — Thai Phan
(74) *Attorney, Agent, or Firm* — James J. Bitetto; Joseph Kolodka (57) ABSTRACT

A system and method for bounded model checking of computer programs includes providing a program having at least one reachable property node. The program is decomposed for bounded model checking (BMC) into subproblems by creating a tunnel based on disjunctive control paths through the program. A reduced BMC sub-problem obtained using BMC unrolling, while using path constraints imposed by the at least one tunnel. For the reachable property node, determining a quantifier-free formula (QFP) in a decidable subset of first order logic. Satisfiability of the QFP is checked, independently and individually, to determine whether the QFP is satisfiable for the subproblem. The decomposing is continued until the a BMC bound is reached.

14 Claims, 7 Drawing Sheets

FIG. 1

```
1.  void foo(int a,
2.              int b)
3.  { /* precondition */
4.      assume(1 ≤ a ≤ 10);
5.      assume(1 ≤ b ≤ 10);
6.      if (a≥b) {
7.          do {
8.              if (b≤a) a=a-b;
9.              else b=b-a;
10.         }while(b!=0);
11.     }else {
12.         do{
13.             if (a≤b) b=b-a;
14.             else a=a-b;
15.         }while(a!=0);
16.     }
17.     assert(a!=0 && b!=0);
18. }
```

FIG. 2

CFG

Method 1:

TSR-based BMC

1: input $Transition : T, CFG - SOURCE : S$
2: $\quad ErrorBlock : Err$
3: $\quad Bound : n, TunnelThrehold : TSIZE$
4: output $FAIL/PASS$
5:
6: $R := Compute\_CSR(CFG, n)$
7: for $0 \leq k \leq n$ do
8: $\quad$ if $Err \notin R(k)$ then
9: $\quad\quad$ continue;
10: $\quad$ end if
11: $\quad t := Create\_Tunnel(\{\tilde{c}_0 = \{S\}, \tilde{c}_k = \{Err\}\})$
12: $\quad part_t := Partition\_Tunnel(t, TSIZE)$
13: $\quad ord\_part_t := Order(part_t)$
14: $\quad$ for all $t_i \in ord\_part_t$ do
15: $\quad\quad BMC_{t_i}^k := BMC^k|_{t_i}$
16: $\quad\quad FC_{t_i} := FC(t_i)$ {optional}
17: $\quad\quad$ if $SAT(BMC_{t_i}^k \wedge FC_{t_i})$ then
18: $\quad\quad\quad$ return $FAIL$ {CEX found}
19: $\quad\quad$ end if
20: $\quad$ end for
21: $\quad R(k) := R(k) - Err$
22: end for
23: return $PASS$ {No violation found within the bound}

FIG. 6

Method 2:

Partition_Tunnel

1: input $Tunnel : t, Tunnelthreshold : TSIZE$
2: output Set of disjunct tunnels, $part_t = \{t_1, \ldots, t_m\}$ s.t. $t_i \cap t_j = \emptyset, i \neq j$, and $t = \bigcup_i t_i$.
3:
4: $part_t := \emptyset$
5: if $tunnel\_size(t) > TSIZE$ then
6:    return $\{t\}$
7: end if
8: $\{TP \stackrel{def}{=} \{(i,j) \mid \tilde{c}_i, \tilde{c}_j \text{ are specified, and } \forall_{i<h<j} \tilde{c}_h \text{ is unspecified}\}\}$
9: Pick $(h,k) \in TP \mid \Sigma_{l=h}^{k}|\tilde{c}_l| = MAX_{(h',k') \in TP}\{\Sigma_{l=h'}^{k'}|\tilde{c}_l|\}$
10: Pick $i$ s.t. $h < i, j < k$ and $|\tilde{c}_i| = MIN_{h<j<k}\{|\tilde{c}_j|\}$
11: for all $a \in \tilde{c}_i$ do
12:    $\{$replace $\tilde{c}_i$ with $\tilde{c}'_i = \{a\}$ in $t$ at depth $i\}$
13:    $t' = Replace\_Tunnel\_Post(t, \tilde{c}_i, \tilde{c}'_i, i)$
14:    $\{$recursive partition$\}$
15:    $part_t := part_t \cup Partition\_Tunnel(t')$
16: end for
17: return $part_t$

FIG. 7

SYSTEM AND METHOD FOR TUNNELING AND SLICING BASED BMC DECOMPOSITION

RELATED APPLICATION INFORMATION

This application claims priority to provisional application Ser. No. 60/987,203 filed on Nov. 12, 2007, incorporated herein by reference.

BACKGROUND

1. Technical Field

The present invention relates to computer verification and more particularly to decomposing bounded model checking to improve efficiency and reduce complexity for computer program verification.

2. Description of the Related Art

Bounded Model Checking (BMC) is a technique used in computer program verification. BMC provides complete design coverage with respect to a correctness property for a bounded depth. In spite of using richer expressive theories to obtain compact representation, and using on-the-fly circuit simplification, each BMC instance at depth k grows bigger in size and harder to solve with successive unrolling of the design. To build a scalable framework, it is quite imperative to decompose each BMC problem at depth k into smaller sub-problems that can be solved separately to reduce the peak resource requirement.

Moreover, to efficiently exploit modern servers with many-core CPUs, it is important that these sub-problems be solved independently with minimum sharing of information. Further, due to memory limitations of single servers, it is important that these sub-problems also have small memory footprints.

Several techniques for decomposition symbolic traversal techniques have been employed to address these issues. However, these symbolic traversal techniques do not address the scalability requirement. In BDD-based approaches in the art, the transition relation and reachable state space are partitioned, and disjunctive image computations are carried out on each partition independently. Such a state-based partitioning approach requires "remembering" the reachable states explored by each sub-problem.

Though, these methods avoid intermediate blow-up of image computation, re-partitioning of reachable states for a next traversal step can be quite resource intensive. When implemented in a distributed environment or on a many-core CPU server, such an approach will incur large communication costs in redistributing the results of disjunctive image operations.

In a distributed BMC approach, each BMC instance is partitioned structurally so that each processor gets an exclusive number of consecutive BMC time frames. The distributed problem is then solved by a distributed SAT, managed by a central server. Though this method overcomes the memory limitation of single processor, and employs fine grain parallelization of Boolean or propositional satisifiability (SAT), it incurs significant communication overhead during exchange of lemmas and propagation of values across partition interfaces, especially, when the BMC instance is difficult to solve.

In another BMC approach, the partitioning of a BMC instance is performed over conjunction and disjunction of property sub-formulas so as to exploit incremental learning. However, for an atomic sub-formula the BMC instance is not partitioned further.

In a sequential ATPG-based approach, explicit state traversal and unrollings are avoided; rather, solution state cubes at each time frame are enumerated, either in a depth or breath first manner, and which need to be justified. Since the state space is typically exponential for real-world design, this method can potentially space out, in spite of various state caching and pruning techniques proposed for storing solution state cubes. Moreover, this method does not guarantee a shortest counter-example if one exists. This method suffers from the same problem as state-based partitioning approaches.

In symbolic execution used in testing, instead of breadth first symbolic traversal, depth first symbolic traversal is made for a bounded depth. Path conditions are generated for the chosen program path to constrain the symbolic path. Such a method can be considered as an extreme case of partitioning where each program path is explored separately. Completeness for bounded depth is guaranteed by exploring all program paths separately. Since there could be multiple program paths (cross product of each branching condition), such an approach has large overhead.

In an abstraction refinement based approach, each abstract path chosen is a program path with incomplete path conditions. In each refinement step (using a constraint solver), path conditions are derived that are either necessary for showing a concrete witness or are sufficient to show no witness.

SUMMARY

SAT-based Bounded Model Checking (BMC) has been successfully applied to verify real-world designs. BMC is a model checking technique where the falsification of a given a Linear Temporal Logic (LTL) property $\phi$ is checked at a given sequential depth. This includes: unrolling of the design for k time frames, translating the BMC instance into a decision problem $\psi$ such that $\psi$ is satisfiable if $\phi$ has a counter-example of depth (less than or) equal to k, and using a decision procedure to check if $\psi$ is satisfiable.

Strengths of BMC include the following. First, expansive quantification used in symbolic model checking is avoided. Second, reachable states are not stored, avoiding blow-up of intermediate state representation. Third, modern SAT/SMT solvers are able to search through the relevant paths of the problem even though the paths get longer with the each BMC unrolling. In SAT-based BMC, $\psi$ is a propositional formula, and the decision procedure is a Boolean SAT solver. Though several state-of-art advancements have been proposed in SAT-based BMC, there are inherent disadvantages in problem formulation using a Boolean representation. Propositional translations of richer data types, e.g., integer, and high-level expressions in linear arithmetic, lead to a large bit-blasted formula possibly with "loss" of high-level semantics. With the growing use of high-level design abstraction to capture today's complex design features, the focus of verification techniques has been shifting towards using Satisfiability Modulo Theory (SMT) solvers, using richer expressive theories beyond Boolean logic. SMT-based verification methods such as SMT-based BMC can potentially provide more scalable alternatives than SAT-based or BDD-based methods.

In SMT-based BMC, $\psi$ is a quantifier-free formula (QFP) in a decidable subset of first order logic, which is then checked for satisfiability by an SMT solver. SMT-based verification methods look quite promising in providing more scalable alternatives than SAT-based or BDD-based methods. In spite of using richer expressive theories to obtain compact representation, each BMC instance grows bigger in size and becomes harder to solve with unrolling.

To build a scalable framework, it is useful to decompose each BMC problem at depth k into smaller subproblems that can be solved individually to reduce the peak resource requirement. To exploit servers with many-core CPUs efficiently, it is also important that these subproblems can be solved independently with minimum sharing of partial results. Further, due to memory limitations of a single server, we need these subproblems to have small memory footprints. A novel scalable approach to decompose a BMC instance (decision problem $\phi$) disjunctively at depth A: into smaller and independent subproblems, based on tunnels, i.e., set of control paths of length k, instead on unrolled time frames is illustratively described. We simplify each subproblem using lightweight static transformation and learning such as slicing, data path simplification and control flow constraints. We solve each reduced BMC subproblem as an independent decision problem $\phi$; such that $\phi$ is satisfiable if and only if there exists a satisfiable $\phi_i$. To reduce the overhead of repeated search over same states, and to exploit incremental solving, various partitioning heuristics such as graph-based partitioning, and procedure call graphs, and subproblem ordering can also be incorporated easily. Such a Tunneling and Slicing-based Reduction (TSR) approach improves the overall BMC performance by reducing the peak requirement of resources.

Though BMC has been used primarily for verifying hardware designs, it has also been used in verifying low-level software programs in C. In this work, we focus on verifying such low-level embedded programs under the assumptions of finite recursion and finite data. For embedded programs that need a high degree of reliability, dynamic memory allocations and recursion are discouraged. We formulate common design errors such as array bound violations, null pointer de-referencing, use of uninitialized variables, and user-provided assertions as reachability properties, and solve them using BMC.

To reduce the model size and eliminate redundant checks, often static analyzer tools are applied on these programs as a preprocessing step. Though several such properties get resolved during static analysis phase, many of them still remain unresolved while some are flagged as potential design errors to be resolved by the designers. To reduce the burden on the designer, BMC is applied as last resort. Thus, it is quite important to have a robust and scalable BMC.

A system and method for bounded model checking of computer programs includes providing a program having at least one reachable property node. The program is decomposed for bounded model checking (BMC) into subproblems by creating a tunnel based on disjunctive control paths through the program. A reduced BMC sub-problem is obtained using SMC unrolling, while using path constraints imposed by the at least one tunnel. For the reachable property node, a quantifier-free formula (QFP) is determined in a decidable subset of first order logic. Satisfiability of the QFP is checked, independently and individually, to determine whether the QFP is satisfiable for the subproblem. The decomposing is continued until the BMC bound is reached.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A scalable approach to decompose a Bounded Model Checking (BMC) instance (e.g., a decision problem, $\psi$) disjunctively at depth k into smaller and independent sub-problems is provided. The present approach is based on tunnels, i.e., a set of control paths of length k, instead of partitioning on reachable states. Each sub-problem is simplified using low overhead static transformations and learning, such as, slicing, data path simplification and partition-specific control flow constraints.

Each reduced BMC sub-problem is solved as an independent decision problem $\psi_i$ so that the $\psi$ is satisfiable if and only if there exists a satisfiable $\psi_i$. Such a Tunneling and Slicing-based Reduction (TSR) approach improves the overall BMC performance by reducing the peak requirement of resources.

The present focus is on verifying low-level embedded programs using BMC. To reduce the model size and eliminate redundant checks, often static analyzer tools are applied on these programs as a preprocessing step. Though several such properties get resolved during a static analysis phase, many of the properties still remain unresolved and some properties are flagged as potential design errors to be resolved by the designers. To reduce the burden on the designer, BMC is applied as a last resort. Thus, it is quite important to have a robust and scalable BMC.

Tunneling and Slicing-based Reduction in accordance with the present principles for BMC decomposition has several advantages and overcomes many drawbacks of the prior art, thereby permitting faster and memory-efficient verification of low-level embedded programs. One approach can be easily parallelized over many core CPUs without incurring communication overhead, as the present decomposition produces independent sub-problems.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Advantageously, in accordance with the present principles, a decomposition is path-based in contrast to state-based decomposition of the prior art. By slicing away irrelevant paths not in a partition, each BMC sub-problem is much more reduced than the original BMC instance, and is potentially easier to solve. Further, the BMC can be stopped as soon as the sub-problem is found satisfiable. Note, each satisfiable trace provides a shortest witness.

Unlike sequential execution approaches used in testing, the present approach permits more than one control path for symbolic traversal; thereby, obtaining a balance between a number of partitions and a size of partition. In a single threaded environment, at any given time only one sub-problem is solved; which in turn, improves the space efficiency. Each BMC sub-problem is preferably generated on-the-fly and removed from memory once it is solved. Since each computation of sub-problem is practically "stateless", the resource requirement is decided solely by the "difficulty" of the current sub-problem. Thus, by maintaining the size of the partition small enough, the present embodiments are able to control the peak resource requirement.

The decomposed sub-problems do not require communication with each other as each sub-problem is independent. For a distributed environment or servers with many cores, each sub-problem can be scheduled on a separate process, without incurring any communication cost between them.

Figure 1:
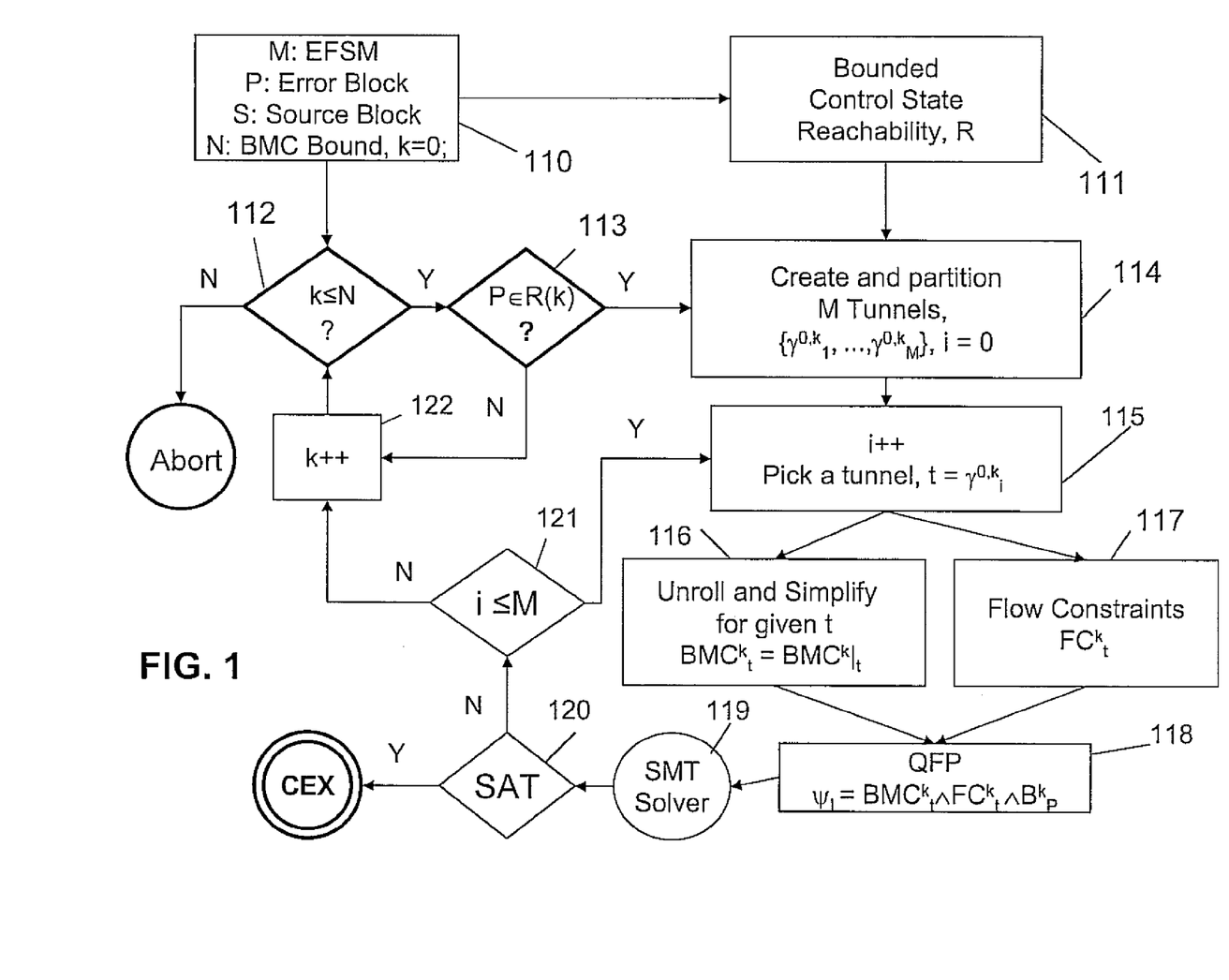
FIG. 1 is a block/flow diagram showing a system/method for bounded model checking decomposition in accordance with the present principles.

Referring now to the drawings in which like numerals represent the same or similar elements and initially to FIG. 1, a system/method 100 of decomposing a bounded model checking (BEC) problems is illustratively depicted, for decomposing BMC into simpler and independent problems using a tunneling and slicing based reduction strategy. In block 110, an extended finite state machine (EFSM) M, Error Block P, Source Block S, and BMC bound N are given. An extended finite state machine (EFSM) includes a transition that can be expressed by an "if statement" that if satisfied, the transition is fired, bringing the machine from a current state to a next state and performing the specified operations.

In block 111, bounded control state reachability information R is computed up to the depth N. For every k≦N in block 112, we check if P∈R (k) in block 113. If P is statically not reachable at depth k, the BMC step of block 114 is skipped at k, and k incremented in block 122 and checked again in block 112. If k equals N, the program is aborted. If P is statically reachable at depth k, BMC decomposition is performed.

In block 114, a tunnel is created, e.g., a set of control paths are created. We then we may partition the tunnel disjunctively (based on the control paths) into a set of M smaller tunnels $\{\gamma^{0,k}_1, \ldots, \gamma^{0,k}_M\}$. We pick an unselected tunnel $t=\gamma^{0,k}_i$ in block 115, and obtain a reduced BMC sub-problem $BMC^k/_t$ in block 116, using on-the-fly simplification of BMC unrolling, while using path constraints imposed by the tunnel $\gamma^{0,k}_i$. Optionally, we also apply flow constraints, $FC^k/_t$ in block 117.

For the reachable property node P, we obtain a quantifier-free formula (QFP) (e.g., $BMC^k/_t \wedge FC^k/_t \wedge B^k_P$) in a decidable subset of first order logic in block 118. In block 119, we check the satisfiability of the reduced and constrained disjunctive BMC formula, independently and individually, preferably using a Satisfiability Modulo Theory (SMT) solver. If the formula is satisfiable in block 120, we stop the BMC as we obtain a counter-example (CEX). Otherwise, we continue picking an unselected tunnel in block 121, if i≦M, by returning to block 115, incrementing i, and picking another tunnel.

If all BMC sub-problems are unsatisfiable, we increase k in block 122. We continue the above process, until we reach the bound N. The present approach provides a basic framework for BMC decomposition based on paths. To reduce the overhead of repeated search over same states, and to exploit incremental solving, various heuristics for partitioning such as graph-based and program semantics-based, and partitioning ordering can be incorporated easily.

The concepts as described with respect to FIG. 1 will now be described in greater detail. An Extended Finite State Machine (EFSM) model M is a 5-tuple ($s_0$, C, I, D, T) where $s_0$ is an initial state, C is a set of control states (or blocks), I is a set of inputs, D is an dimensional space $D_1 \times \ldots \times D_n$ valuations of n datapath variables, and T is a set of 4-tuple (c, x, c', x') transitions where c, c'∈C and x, x'∈X. An ordered pair <c, x>∈C×D is called a configuration or state of M. Let g:D×I↦B={0,1} denote a Boolean-valued enabling condition (or guard), and u:D×I↦D denote an update function. A transition from a state <c,x> to <c',x'> under enabling predicate g(x, i), and update relation u(x, i, x') is represented as $$<c, x> \xrightarrow{g/u} <c', x'>.$$

We assume there is no self-loop, i.e., c≠c'. Let Γ:C×C↦{0,1} denote a Boolean predicate such that for c,c'∈CΓ (c,c')=1 if and only if there is an enabling condition associated with the control transition from c to c'. An NOP state is a control state with no update transition, and a single incoming (outgoing) transition. A SINK state is a unique control state with no outgoing transition, and a SOURCE state is a unique control state with no incoming transition.

Let $s_i \equiv c_i, x_i>$ denote a state, and $T(s_i, s_{i+1})$ denote the state transition relation. A path is a sequence of successive states, denoted as $\pi^{0,k}=(s_0, \ldots, s_k)$ satisfying the predicate $$T^{0,k} \stackrel{def}{=} \bigwedge_{0 \leq i < k} T(s_i, s_{i+1}) \qquad (1)$$

with $\pi^{0,0}=1$. A path has length k if it makes k transitions. A BMC instance comprises checking if an LTL (Linear Temporal Logic) property ϕ can be falsified in exactly k steps from the initial state $s_0$ of the following formula:

$$BMC^k \stackrel{def}{=} T^{0,k} \wedge \neg \phi(s_k) \qquad (2)$$

where ϕ($s_k$) denotes the predicate that ϕ holds in state $s_k$. BMC iteratively checks the satisfiability of the formula 2 0≦k≦n using an SMT or SAT solver.

A control flow graph (CFG) G=(V,E,r) includes a set of nodes V corresponding to control states, a set of directed control flow edges E, and an entry node r. A CFG is obtained from an EFSM M by ignoring the enabling and updated transitions, i.e., we obtain control CFG from M with v=C,E={(c,c') |Γ(c,c')=1}, and r=SOURCE.

Figure 2:
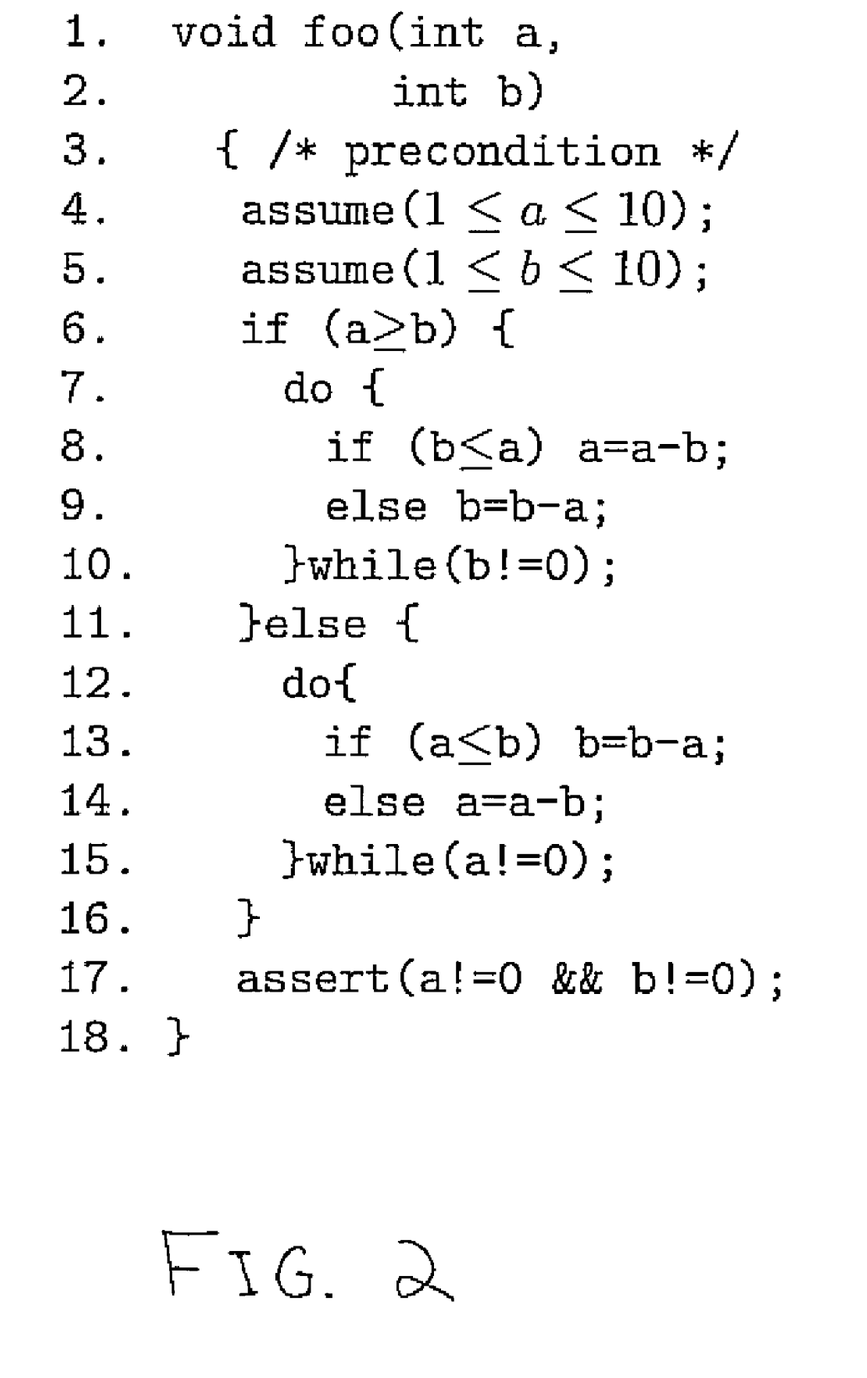
FIG. 2 is an illustrative C program for demonstrating the present principles.

Example: Consider a low-level C program foo as shown in FIG. 2 with a corresponding EFSM shown in FIG. 3. The control states, shown as boxes in FIG. 3, correspond to control points in the program of FIG. 2, as also indicated by the line numbers indicated in the boxes. Note, each control state is identified with a number (1-10) in a small square box attached. For example, SOURCE is block 1 (SOURCE BLOCK), and ERROR is block 10 (ERROR BLOCK). Update transitions of data path expressions are shown at each control state. Transition edges between control states in the EFSM correspond to control flow between their associated control points in the program. Each such edge is associated with an enabling predicate.

A control path is a sequence of successive control states, denoted as $\gamma^{0,k} = c_0, \ldots, c_k$ satisfying the predicate $$\Gamma^{0,k} \stackrel{def}{=} \bigwedge_{0 \leq i < k} \Gamma(c_i, c_{i+1}) \quad (3)$$

with $\Gamma^{0,0}=1$.

We interchangeably use control state and control node to mean the same thing in the context of EFSM and CFG, respectively. We define a Boolean predicate $B_r \equiv (PC=r)$, where PC is the program counter that tracks the current control state. In the sequel, we use $v^d$ to denote the unrolled variable v at depth d during BMC unrolling.

A control state reachability (CSR) analysis is a breadth-first traversal of the CFC where a control state b is one step reachable from a iff $\Gamma(a,b)$, i.e., there exists some enabling transition $a \rightarrow b$. At a given sequential depth d, let R(d) represents the set of control states that can be reached statically, i.e., ignoring the guards, in one step from the states in R(d−1), with $R(0)=c_0$. We say a control state a is CSR-reachable at depth k if $a \in R(k)$. Computing CSR for the CFG of M (FIG. 3)), we obtain the set R(d) for $0 \leq d \leq 7$ as follows and as depicted in an unrolled CFG 230 in FIG. 4:
R(0)={1},R(1)={2,6}, R(2)={3,4,7,8},
R(3)={5,9}, R(4)={2,10,6}, R(5)={3,4,7,8},R(6)={5,9},R (7)={2,10,6}. For some d (unroll depth), if R(d−1)≠R(d) =R(d+1), we say that the CSR saturates at depth d.

Given two predicates f and g, we define a constraint (or simplify) operator, denoted as $f|_g$, so that $f|_g=f$ if $g=1$; otherwise, $f|_g=$don't_care. Thus, $f|_g \wedge g = f \wedge g$. We say two formulas A and B are equi-satisfiable, denoted as $A \Leftrightarrow_{sat} B$, if satisfiability of one implies that of the other, and vice versa. For a given set A, we use |A| to denote the size of A.

Modeling C to EFSM: Model building from a given C program under the assumption of a bounded heap and a bounded stack will now be described. We obtain first a simplified CFG by flattening the structures and arrays into scalar variables of simple types (Boolean, integer, float). We handle pointer accesses using direct memory access on finite heap model, and apply standard slicing and constant propagation. We do not inline non-recursive procedures to avoid blow up, but bound and inline recursive procedures. From the simplified CFG, we build an EFSM where each block is identified with a unique id value, and a control state variable PC denoting the current block id. We construct a symbolic transition relation for PC, that represents the guarded transitions between the basic blocks. For each data variable, we add an update transition relation based on the expressions assigned to the variable in various basic blocks in the CFG. We use Boolean expressions and arithmetic expressions to represent the update and guarded transition functions. The common design errors are modeled as ERROR blocks.

TUNNELING AND SLICING-BASED REDUCTION (TSR): decomposing a BMC instance at depth k into simpler subproblems will now be described, where each subproblem comprises an exclusive subset of concrete paths of length k. Consider the low-level C program foo and its EFSM and CFG shown in FIGS. 2 and 3. We obtain an unrolled CFG by simply unwinding the CFG up to depth k as shown for CFG 230 in FIG. 4 for k=7. Note, each control path in the unrolled CFG 230 is an abstract program path from the initial state, SOURCE. A BMC instance can be obtained by unrolling the EFSM model up to depth k, which captures all the program paths of length k. Further, each program (concrete) path in an BMC instance up to depth k, is an instance of (abstract) control path in the unrolled CFG 230. As the unrolled depth increases, the number of paths (and control paths) and their lengths also increases, thereby, making each successive BMC instance increasingly harder to solve.

Figure 3:
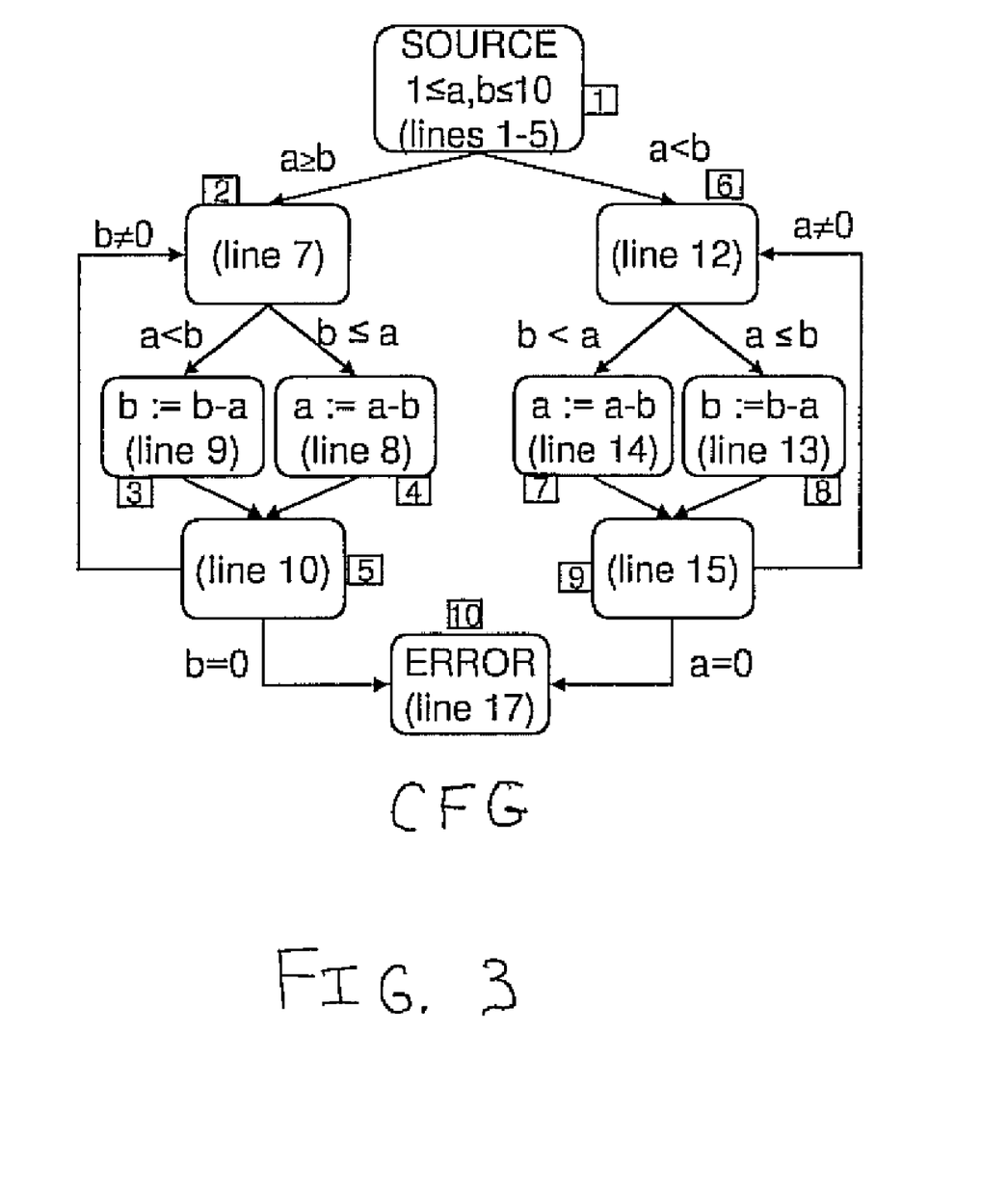
FIG. 3 is an illustrative extended finite state model (EFSM) for the program of FIG. 2 for demonstrating the present principles.
Figure 4:
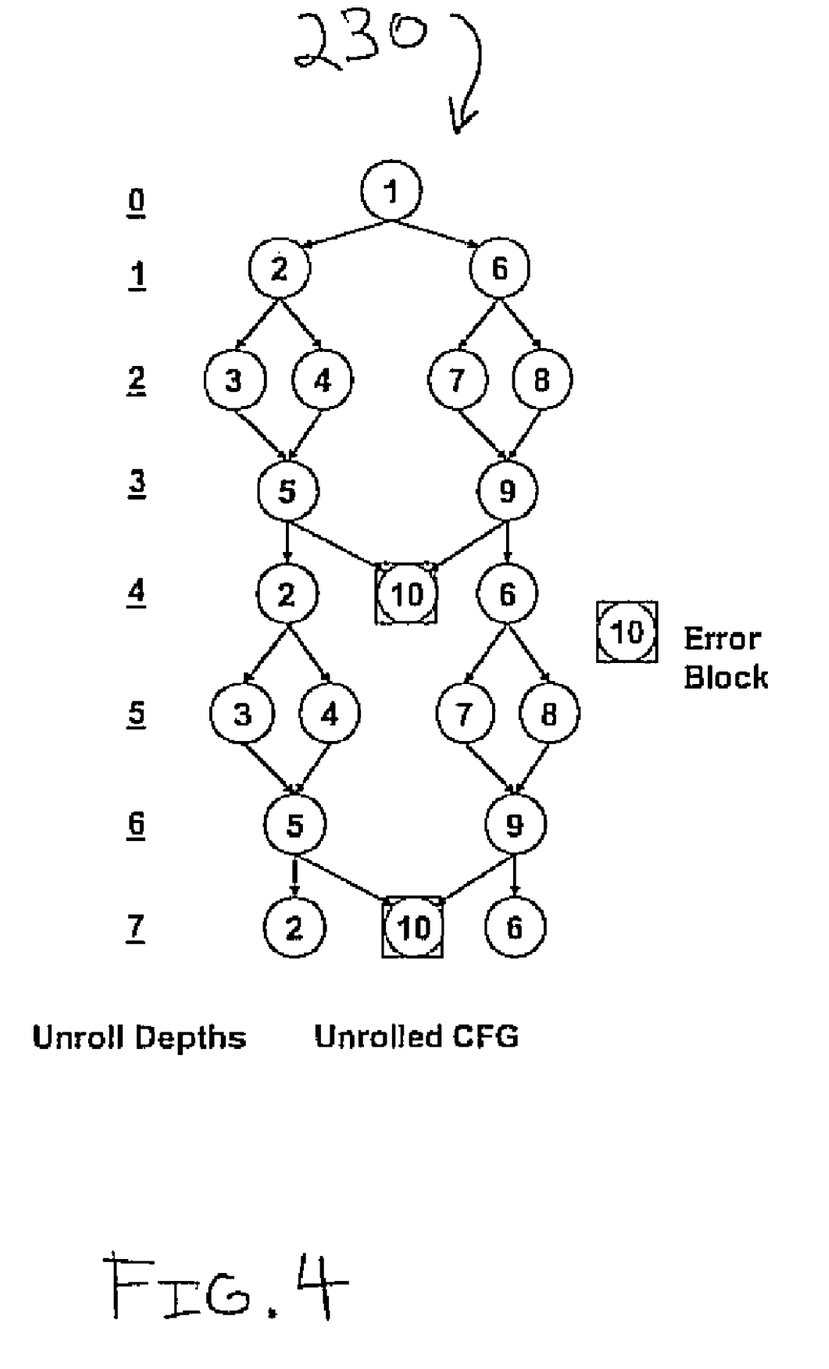
FIG. 4 is an unrolled control flow diagram of depth 7 demonstrating tunnel-posts for demonstrating the present principles.

Referring to FIG. 4 with continued reference to FIGS. 2 and 3, the number of control paths to reach error block 10 increases from four to eight, as k (unroll depths) increases from 4 to 7, respectively.

Figure 5:
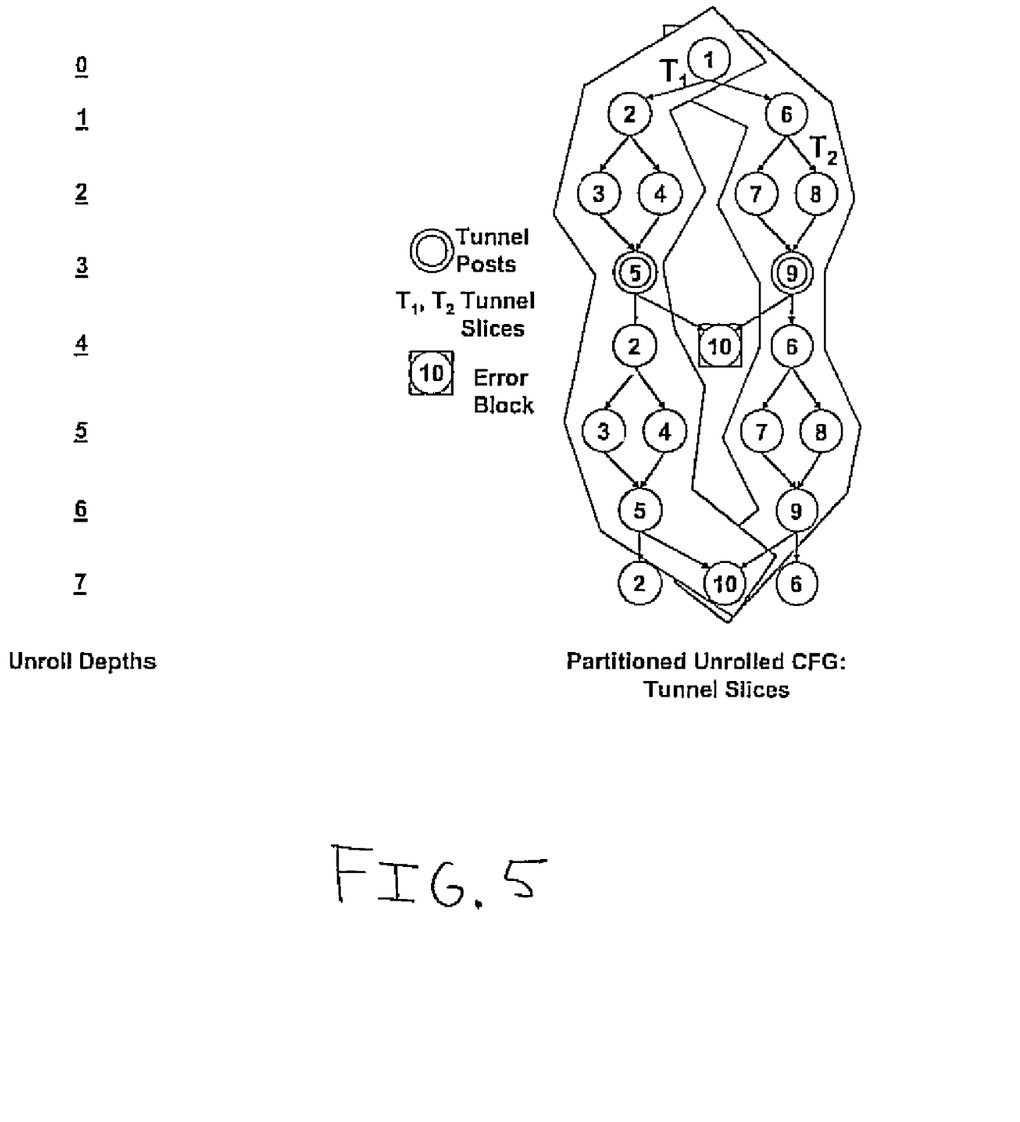
FIG. 5 is a partitioned unrolled control flow diagram of depth 7 showing tunnel partitioning in accordance with the present principles.

In accordance with the present principles, a decomposition of the BMC instance at k=7 into smaller disjunctive subproblems is performed by partitioning the control paths. Suppose, we choose a partition depth p=3. Note, at this partition depth, control states 5 and 9 are statically reachable. All control paths from block 1 (SOURCE) to block 10 (ERROR) at depth 7, pass through either 5 or 9 (at depth 3). We refer to these control states as "tunnel-posts" (FIG. 5). We obtain a disjoint partition of tunnel-posts, i.e., {5} and {9} in FIG. 5. From the control state(s) in each partitioned tunnel-post, i.e., {5} (or {9}), ERROR block at 7, and the SOURCE block, we perform forward and backward slicing on the unrolled CFG to obtain a disjoint set of control paths, i.e., $T_1$ and $T_2$ as shown in FIG. 5. The disjoint set of control paths are referred to as "tunnels". Note, all control paths in tunnels $T_1$ and $T_2$ in FIG. 5 pass through the partitioned tunnel-posts 5 and 9, respectively at partition depth 3. Clearly, the BMC subproblems obtained at depth k=7, constrained by tunnel $T_1$ (or $T_2$) have fewer paths, and are potentially easier to solve than the original BMC instance. We solve each BMC subproblem separately, where the problem is simplified significantly by: 1) slicing away irrelevant paths, i.e., paths not in the tunnel, 2) reducing the data path expressions for the relevant paths, and 3) adding control flow teachability constraints for the relevant paths.

Note, satisfiability of any BMC subproblem implies satisfiability of the BMC instance. Further, due to independency of the subproblems with very little sharing, we effectively obtain an efficient method for parallelization. With this basic decomposition idea, we formally present the methods and partition heuristics as well as and systems for implementing them. These mitigate the inherent partitioning overhead.

The Tunneling and Slicing-based Reduction (TSR) method for BMC decomposition has several advantages: 1) the decomposition is path-based in contrast to state-based decomposition, or unrolled time frame based decomposition. By slicing away irrelevant paths not in a partition, each BMC subproblem is much more reduced than the original BMC instance, and is potentially easier to solve. Further, one can stop BMC as soon as the subproblem is found satisfiable. Note, each satisfiable trace provides a shortest witness. 2) Unlike sequential execution approaches used in conventional testing, our approach permits more than one control path for symbolic traversal; thereby, we obtain a balance between number of partition and size of partition. 3) In a single threaded environment, at any given time only one subproblem is solved; which in turn improves the space efficiency. We generate each BMC subproblem on-the-fly (which can be removed from memory once it is solved). Since computation of each subproblem is practically "stateless", the resource requirement is decided solely by the "difficulty" of the current subproblem. Thus, by maintaining the size of the partition small enough, we are able to control the peak resource requirement. 4) Unlike previous approaches, our decomposed subproblems do not require any communication between them as each subproblem is independent. For a distributed environment or servers with many-core CPUs, each subproblem can be scheduled on a separate process, without incurring any communication cost between them. 5) A basic partitioning and subproblem ordering scheme are targeted to reduce partitioning overhead and exploit incremental solving. This scheme can be enhanced easily using several partitioning heuristics such as graph-partitioning, and procedure call graphs. In short, we provide a basic framework for BMC decomposition based on paths, which is a facilitator for several other heuristics. 6) We have implemented our method in Satisfiability-Modulo-Theory (SMT)-based BMC framework and provide experimental results on industry designs. Our controlled experiments demonstrate the efficacy of our approach.

Tunnels: Let $\bar{c_i} \subset R(i)$ denote a set of control states reachable at depth i from an initial control state. We define a Boolean predicate $\tilde{\Gamma}(c_i, c_{i+1})=1$ if and only if $\forall c_i \in \tilde{c}_i \exists c_{i+1} \in \tilde{c}_{i+1} \Gamma(c_i, c_{i+1})=1$ and
$\forall c_{i+1} \in \tilde{c}_{i+1} \exists c_i \in \tilde{c}_i \Gamma(c_i, c_{i+1})=1$ We refer to $\tilde{c}_i$ as a tunnel-post. We define a tunnel, as sequence of tunnel-posts denoted as $\tilde{\gamma}^{0,k} = \tilde{c}_0, \ldots, \tilde{c}_k$ satisfying the predicate $$\tilde{\Gamma}^{0,k} \stackrel{def}{=} \bigwedge_{0 \leq i < k} \tilde{\Gamma}(\tilde{c}_i, \tilde{c}_{i+1}) \quad (4)$$

with $\tilde{\Gamma}^{0,0}=1$. Note, a tunnel essentially represents a set of control paths, i.e., $$\tilde{\gamma}^{0,k} = \{\tilde{\gamma}^{0,k} | \forall_{0 \leq i \leq k} c_1 \in \tilde{c}_i\} \quad (5).$$

Example (see FIG. 4): For $\tilde{c}_1=\{2,6\}, \tilde{c}_2=\{3,4,7\}$, and $\tilde{c}^1_2=\{3,4\}$, we have $\tilde{\Gamma}(\tilde{c}_1, \tilde{c}_2)=1$, but $\tilde{\Gamma}(\tilde{c}_1, \tilde{c}^1_2)=0$. If all the tunnel-posts are specified, we call such a tunnel fully-specified; otherwise, partially-specified. We say a tunnel $\tilde{\gamma}^{0,k}$ is well-formed if and only if:

The end tunnel-posts, i.e., $\tilde{c}_0$ and $\tilde{c}_k$ are specified, and
Given any two specified tunnel-posts $\tilde{c}_i$ and $\tilde{c}_j$.

$0<i<j \leq k \forall_{ci \in \tilde{c}_i} \exists_{cj \in \tilde{c}_j} \Gamma^{i,j}=1 \text{ and } \forall_{cj \in \tilde{c}_j} \exists_{ci \in \tilde{c}_i} \Gamma^{i,j}=1.$ Example (see FIG. 5): A fully-specified and well-formed tunnel $T_i(\gamma^{0,k})$ is $\tilde{c}_0=\{1\}, \tilde{c}_1=\{2\}, \tilde{c}_2\{3,4\}, \ldots, \tilde{c}_y=\{10\}$. Given a partially-specified well-formed tunnel, we can construct a fully-specified tunnel as follows:

Between any two neighboring specified $\tilde{c}_i$ and $\tilde{c}_j$, i.e. all the tunnels-posts $\tilde{c}_h$ where $i<h<j$ are unspecified, we compute j−i steps forward CSR from $\tilde{c}_i$, and j−i steps backward CSR from $\tilde{c}_j$.

We form a set $\tilde{c}_h$ with the control states that are reachable from both forward and backward CSR. Note, effectively we "slice away" the unreachable control paths as well.

Example (see FIG. 5): A partially specified tunnel $t=\tilde{c}_0=\{1\}, \tilde{c}_3=\{5\}$ can be converted to fully-specified tunnel by computing forward and backward CSR from the specified tunnel-posts, and taking the intersection of reachable control states. Thus, we obtain a full-specified tunnel t with tunnel-posts $\tilde{c}_0=\{1\}, \tilde{c}_1=\{2\}, \tilde{c}_2=\{3,4\}, \tilde{c}_3=\{5\}$.

LEMMA 1. A fully-specified tunnel constructed above is also well formed and unique for a given control flow graph and a given sequence of specified tunnel-posts.

In the sequel, we only consider well-formed tunnels. We often identify a tunnel with a (partial) sequence of specified tunnel-posts, and implicitly associate it with an equivalent fully-specified tunnel (using Lemma 1). In the present disclosure, we consider the teachability of an ERROR block Err, i.e., $\neg \phi = F(B_{Err})$, where $B_{Err}=1$ 1 if and only if (PC=Err), and F is the LTL operator.

TSR-based BMC Simplification: Given a BMC instance at depth k $BMC^k$, we can use a tunnel $\tilde{\gamma}^{0,k}$ to constrain it, denoted as $BMC^k|_{\tilde{\gamma}ii,k}$ by effectively slicing away the statically unreachable control paths, as follows:

$$BMC^k\Big|_{\gamma^{0,k}} \stackrel{def}{=} T^{0,k}\Big|_{UBC(\tilde{\gamma}^{0,k})} \wedge B^k_{err} \quad (6)$$

$$UBC(\tilde{\gamma}^{0,k}) = \bigwedge_{0 \leq i < k, r \in c_i} \neg B^i_r \quad (7)$$

where UBC, (Unreachable Block Constraint) uses statically unreachable control states to simplify $T^{0,k}$ using on-the-fly size reduction techniques such as functional or structural hushing and constant folding, which are known in the art.

LEMMA 2. $BMC^k|_{\tilde{\gamma}ii,k} \Rightarrow_{SAT} BMC^k$. Let $t=\tilde{\gamma}^{0,k}$ denote a tunnel with specified tunnel posts $\tilde{c}_0=\{SOURCE\}$ and $\tilde{c}_k=\{Err\}$, where $Err \in R(k)$. Note, that the tunnel t represents the set of all paths of length k that can potentially reach the Err block at depth k.

THEOREM 1. $BMC^k|_t \Leftrightarrow_{SAT} BMC^k$. It can be shown that the satisfiability of $BMC^k$ also implies satisfiability of $BMC^k|_t$.

TSR-based BMC Decomposition: We define size of tunnel t, $$size_i = \sum_{0 \leq i \leq k} |\tilde{c}_i|.$$

In general, a large tunnel size implies less reduction of $BMC^k|_t$. To avoid solving a large monolithic BMC formula, we decompose it using smaller disjunctive tunnels. Given a tunnel $t=\tilde{\gamma}^{0,k}$, we can further partition a tunnel into a set of tunnels $t_i$ by partitioning tunnel-post $c_h$ at some depth h disjunctively, such that each partition tunnel $t_i$ comprises a subset of control paths in t passing through the disjoint tunnel post $\tilde{c}_{h,i}$, respectively. Notation-wise we have a tunnel partition $t_i$ with tunnel posts $\tilde{c}_0, \ldots, \tilde{c}_{h-1}, \tilde{c}_{h,i}, \tilde{c}_{h+1}, \ldots, \tilde{c}_k$; where $\tilde{c}_h = \cup_i \tilde{c}_{h,j}$ and $\tilde{c}_{h,i} \cap \tilde{c}_{h,j}=0, i \neq j$.

LEMMA 3. Each partitioned tunnel has exclusive control paths, i.e. $t_i \cap t_j=0, i \neq j$. Further, partition is complete, i.e., $t=\cup_i t_i$.

Given a tunnel partition set $part_i=\{t_1, \ldots, t_m\}$, a $BMC^k$ can be partitioned disjunctively into simpler subproblems constrained separately by a tunnel partition $t_i$, i.e., $BMC^k|_{parti}=\vee_i BMC^k|_{t_i}, BMC^k i_{,i}$.

THEOREM 2. $BMC^k|_t \Leftrightarrow_{SAT} BMC^k|_{partt}$. As k increases, the $BMC^k$ problem becomes larger, and increasingly harder to solve. In general, partitioning and constraint simplification overhead are insignificant compared to solving $BMC^k$. Thus, by decomposing $BMC^k$ formula into disjunctively partitioned simpler $BMC^k|_t$ subproblems that are independent, one can potentially reduce the peak resource requirement, and use distributed resources when available. Note, due to an inherent overhead with any partitioning method, one has to balance the size of partitions against the number of partitions.

Figure 6:
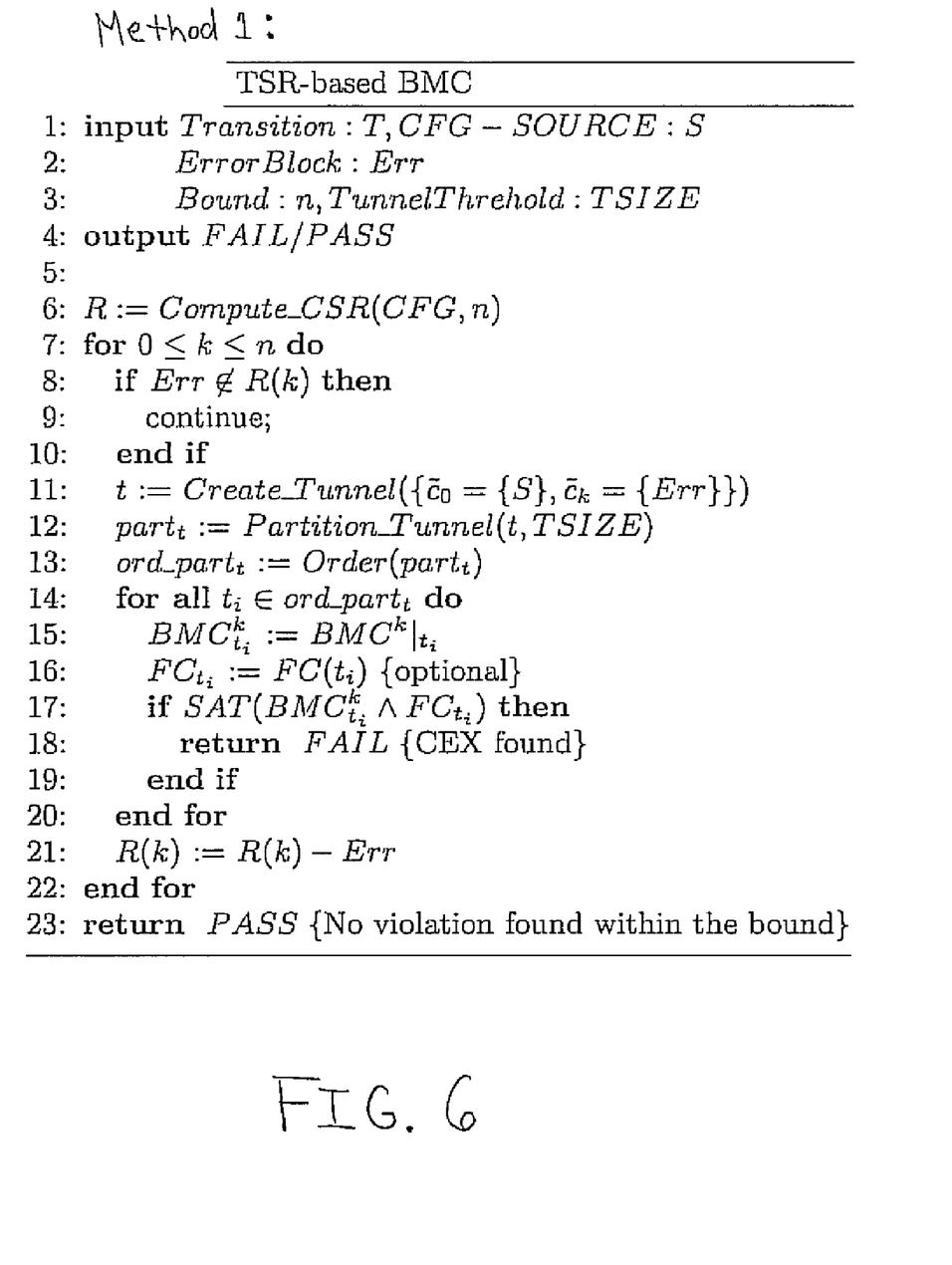
FIG. 6 is an illustrative program for performing a tunneling and slicing-based reduction for bounded model checking in accordance with the present principles.

Referring to FIG. 6, Method 1 presents illustrative pseudo-code for decomposing BMC into simpler and independent subproblems using the Tunneling and Slicing based Reduction strategy. In line 6, procedure Compute_CSR takes the CFG G, and computes bounded CSR for depth n. In lines 8-9, if Err is not statically reachable at depth k, BMC step is skipped. In line 11, procedure Create_Tunnel takes two end tunnel-posts, and builds a tunnel t using forward and backward control flow reachability information. One can use control and data dependent slicing to potentially reduce the tunnel further. In line 12, we partition the tunnel using the algorithm Partition_Tunnel (presented in Method 2). Using a tunnel threshold size TSIZE, it recursively partitions the tunnel t into a set of disjunctive tunnels, part$_t$.

Given a partition set part$_t$, we obtain an ordered set ord_part$_t$ of partitions using the procedure Order(part_t) (in line 13). The goals of the ordering heuristic include:
- to facilitate incremental solving, and
- to prioritize "easier" partitions.

Here, we use sharing of the tunnel-posts among tunnels and tunnel sizes as the criteria for prioritization. Specifically, if two tunnels $t_i$ and $t_j$ have the same prefix of tunnel-posts up to some h<k, one can share the transition and learning constraints between the overlapped problems $BMC^k|_{t_i}$ and $BMC^k|_{t_j}$, from depths 0 to h. Note, one can easily extend the idea of sharing information between overlapping tunnels partitions across successive BMC depths as well.

For each partition $t_i$, we then simplify $BMC^k|_{t_i}$ (line 15) to obtain partition-specific BMC. Optionally in line 16, we add Flow Constraint $FC_{t_i}$. In line 17, we check the satisfiability of the reduced and constrained BMC subproblem independently and individually. We refer to this method as tsr_ckt.

Alternatively, we can also obtain the decomposed BMC problem without partition-specific simplification, by generating $BMC^k$ once for a given depth k, and solving $BMC^k \wedge FC_{t_i}$, for each $t_i$ independently. Although the size of $BMC^k$ is potentially larger than one can avoid the overhead of computing $BMC^k|_{t_i}$ for each partition. We refer to this method as tsr_nockt. Note, for $BMC^k$ we apply circuit simplification using CSR on set R.

If no violation is found at depth k, we remove Err from the reachable set R(k). We return PASS when k>n and no counter-example (CEX) is found. (see also FIG. 1 for a block/flow diagram).

Figure 7:
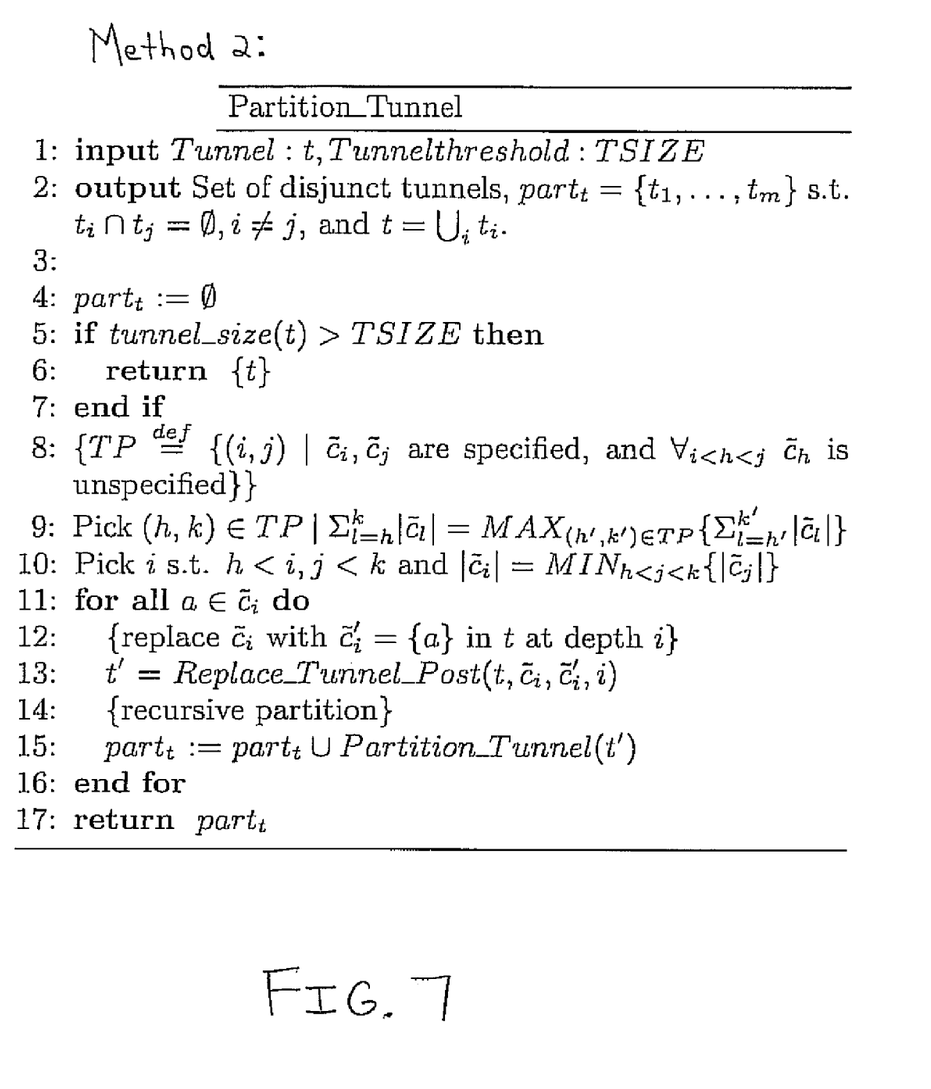
FIG. 7 is an illustrative program for performing tunneling partitioning in accordance with the present principles.

Referring to FIG. 7, for TSR Partitioning, a recursive tunnel partitioning Method 2, based on tunnel size. Given a tunnel t and tunnel threshold size TIZE, we recursively partition the tunnel into a set of disjoint tunnels, i.e., non-overlapping control paths. We explain the basic flow as follows: In line 5, we skip partitioning if the current size is less than threshold TSIZE. In line 9, we select (h, k), a pair of depths with consecutive specified tunnel-posts that includes the maximum (MAX) reachable control states. In line 10, we choose an i between h and k, such that the size of $\tilde{c}_i$, i.e., $|\tilde{c}_i|$ is minimum (MIN). In lines 13-14, we create a partition t' from t, by replacing $\tilde{c}_i$ with a specified tunnel post $\tilde{c}_i' = \{a\}$. On this t', we recursively call the Partition_Tunnel algorithm in line 14 and accumulate the set part$_i$.

Note, the selections in lines 9 and 10 are specifically geared towards minimizing the number of partitions and obtaining a good balance among the partition sizes. This selection heuristic is fairly cheap to compute, with very low overhead (as shown later in our experimental results). It is possible to use more expensive partitioning methods also, especially on larger problems where the relative time for computing the partitions may still be relatively insignificant to the solver runtime.

In general, finding a good partition is a hard problem. On one hand, larger sized partitions make each subproblem more difficult to solve but reduce the partitioning overhead due to repeated work. On the other hand, smaller sized partitions result in easier subproblems, but may significantly increase the partitioning overhead. Our goal is to use partitioning heuristics based on structural information in our EFSM and CFG model. As discussed, Method 2 exploits the control state reachability information.

As the present decomposition is path-based, same paths will not be explored in disjoint subproblems. However, as the basic BMC approach is "stateless", same states can get revisited. In the subproblems, resulting in repeated search from these states. To reduce the overhead, we can also use graph partitioning techniques on the CFG (or the unrolled CFC), to find small edge cutsets. This set corresponds to a set of control sets such that all the paths in the tunnel from SOURCE to ERR passes through at least one in the set, and these states may be reachable at different unroll depths. The resulting partitions will share less numbers of control states, thereby avoiding repeated work in multiple partitions.

PARTITION-SPECIFIC BMC: Size Reduction. CSR can be used to reduce the size of BMC instances. If a control state r∈R(d), then the unrolled transition relation of variables that depend on r can be simplified, as described in the following. Recall, we use a Boolean predicate $B_r \equiv (PC=r)$, where PC is the program counter that tracks the current control state. Also, $v^d$ denotes the unrolled variable v at depth i during BMC unrolling. Consider again model M in FIG. 2, where the next state of variable a is defined as next(a)=$(B_4||B_7)$?a–b:a; (using the C language notation for cascaded if-then-else). For depths i=3,4 blocks 4,7∉R(k), and therefore, $B_4^k = B_7^k = 0$. Using this unreachability control state information, we can hash the expression representation for $a^{k+1}$ to the existing expression $a^k$, i.e., $a^{k+1} = a^k$. This hashing, i.e., reusing of expressions, considerably reduces the size of the logic formula, i.e., the BMC instance.

One can apply similar circuit simplification for a given tunnel. Note, that the set of unreachable blocks at a given depth ≦k for a tunnel $\tilde{c}_0, \ldots, \tilde{c}_k$ is larger than that for R, i.e., $C\backslash\tilde{c}_i$ is larger than $C\backslash R(i)$, where C is total set of control blocks. This leads to more size reduction in partition-specific BMC instances compared to the original BMC instance.

Note, a large cardinality of the set R(d), i.e., |R(d)|, reduces the scope of above simplification and hence, the performance of BMC. Re-converging paths of different lengths and different loop periods are mainly responsible for saturation of CSR. Saturation of CSR leads to large |R(d)|, and adversely affects the size of the unrolled BMC instances.

To avoid saturation, a strategy called Path/Loop Balancing (PB) has been proposed. It transforms an EFSM by inserting NOP states such that lengths of the re-convergent paths and periods of loops are the same, thereby reducing the statically reachable set of non-NOP control states. Note, an NOP state does not change the transition relation of any variable.

Flow Constraints: For a given tunnel $\tilde{\gamma}^{0,k}$, one can obtain a Flow Constraint (FC) comprising a Forward Flow Constraint (FFC), a Backward Flow Constraint (BFC), and a Reachable Flow Constraint (RFC), as follows:

$$FC(\tilde{\gamma}^{0,k}) = FFC(\tilde{\gamma}^{0,k}) \wedge BFC(\tilde{\gamma}^{0,k}) \wedge RFC(\tilde{\gamma}^{0,k}) \qquad (8)$$

$$FFC(\tilde{\gamma}^{0,k}) = \bigwedge_{0 \leq i < k, r \in \tilde{\tau}_i} \left( B_r^i \Rightarrow \bigvee_{s \in (\tilde{\tau}_{i+1} \cap o(r))} B_s^i \right) \qquad (9)$$

-continued $$BFC(\tilde{\gamma}^{0,k}) = \bigwedge_{0<i\leq k, s\in \tilde{c}_i} \left( B_s^i \Rightarrow \bigvee_{s\in (\tilde{c}_{i-1} \cap \text{ from }(s))} B_r^{i-1} \right) \quad (10)$$

$$RFC(\tilde{\gamma}^{0,k}) = \bigwedge_{0\leq i\leq k} \left( \bigvee_{r\in \tilde{c}_i} B_r^i \right) \quad (11)$$

where sets to (s) and from (s) refer to sets of control states in outgoing transitions from s and incoming transitions to s, respectively. Note, flow constraints explicitly capture the control flow information inherent in a tunnel as defined in Equation 4. For example, FFC is described as follows: given a control state r reachable at depth i, i.e., $a^{k+1}=1$, the control state reachable at depth i+1 must be in the intersection of tunnel-post $\tilde{c}_{i+1}$ and to (r) set, For a given $BMC^k|_{\tilde{\gamma}^{0,k}}$, one can also add flow constraints FC ($\tilde{\gamma}^{0,k}$), without affecting satisfiability of $BMC^k|_{\tilde{\gamma}^{0,k}}$, i.e., $BMC^k|_{\tilde{\gamma}^{0,k}} \Leftrightarrow_{SAT} BMC^k|_{\tilde{\gamma}^{0,k}} \wedge FC(\tilde{\gamma}^{0,k})$.

Having described preferred embodiments of a system and method for tunneling and slicing based BMC decomposition (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for bounded model checking of computer programs, comprising:
   providing a program having at least one reachable property node, wherein the program is stored on a computer-readable storage medium;
   decomposing the program for bounded model checking (BMC) into subproblems by:
      creating at least one tunnel based on disjunctive control paths through the program;
      obtaining a reduced BMC sub-problem using BMC unrolling, while using path constraints imposed by the at least one tunnel;
      for the reachable property node, determining a quantifier-free formula (QFP) in a decidable subset of first order logic; and
      checking satisfiability of the QFP, independently and individually, to determine whether the QFP is satisfiable for the subproblem; and
   continuing the decomposing until the a BMC bound is reached.

2. The method as recited in claim 1, wherein creating includes performing forward and backward slicing on an unrolled control flow graph (CFG) to obtain a disjoint set of control paths which pass through partitioned tunnel-posts at a partition depth.

3. The method as recited in claim 1, wherein checking satisfiability is performed using a satisfiability modulo theory (SMT) solver.

4. The method as recited in claim 1, further comprising, if the QFP formula is satisfiable, determining a counter-example (CEX); and if all BMC sub-problems are unsatisfiable, increasing unrolled depth and repeating the decomposing step.

5. The method as recited in claim 1, further comprising applying flow constraints to the at least one tunnel to further constrain the subproblem.

6. The method as recited in claim 1, further comprising computing bounded control state reachability to a bounded model checking bound to determine if the at least one reachable property node exists.

7. The method as recited in claim 1, wherein each subproblem is independent such that each subproblem can be scheduled and solved independently of all other subproblems.

8. The method as recited in claim 1, further comprising partitioning the at least one tunnel into a set of smaller tunnels based on disjunctive control paths and solving each of the set as subproblems.

9. A method for bounded model checking of computer programs, comprising:
   providing a program having at least one reachable property node, wherein the program is stored on a computer-readable storage medium;
   decomposing the program for bounded model checking (BMC) into subproblems by:
      creating at least one tunnel based on disjunctive control paths through the program by performing forward and backward slicing on an unrolled control flow graph (CFG) to obtain a disjoint set of control paths which pass through partitioned tunnel-posts at a partition depth;
      obtaining a reduced BMC sub-problem using BMC unrolling, while using path constraints imposed by the at least one tunnel;
      for the reachable property node, determining a quantifier-free formula (QFP) in a decidable subset of first order logic; and
      checking satisfiability of the QFP, independently and individually, to determine whether the QFP is satisfiable for the subproblem using a satisfiability modulo theory (SMT) solver; and
   continuing the decomposing until the a BMC bound is reached.

10. The method as recited in claim 9, further comprising, if the QFP formula is satisfiable, determining a counter-example (CEX); and if all BMC sub-problems are unsatisfiable, increasing unrolled depth and repeating the decomposing step.

11. The method as recited in claim 9, further comprising applying flow constraints to the at least one tunnel to further constrain the subproblem.

12. The method as recited in claim 9, further comprising computing bounded control state reachability to a bounded model checking bound to determine if the at least one reachable property node exists.

13. The method as recited in claim 9, wherein each subproblem is independent such that each subproblem can be scheduled and solved independently of all other subproblems.

14. The method as recited in claim 9, further comprising partitioning the at least one tunnel into a set of smaller tunnels based on disjunctive control paths and solving each of the set as subproblems.

* * * * *